US010908173B2

(12) United States Patent
Yamasaki et al.

(10) Patent No.: US 10,908,173 B2
(45) Date of Patent: Feb. 2, 2021

(54) SAMPLE MEASUREMENT APPARATUS AND METHOD OF MEASURING SAMPLES

(71) Applicant: SYSMEX CORPORATION, Kobe (JP)

(72) Inventors: Mitsuo Yamasaki, Kobe (JP); Tomonori Okazaki, Kobe (JP); Noriyuki Nakanishi, Kobe (JP); Takahiro Saino, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 472 days.

(21) Appl. No.: 15/592,238

(22) Filed: May 11, 2017

(65) Prior Publication Data

US 2017/0242046 A1  Aug. 24, 2017

Related U.S. Application Data

(63) Continuation of application No. PCT/JP2015/081532, filed on Nov. 10, 2015.

(30) Foreign Application Priority Data

Nov. 14, 2014  (JP) ................................. 2014-232239

(51) Int. Cl.
*G01N 35/04* (2006.01)
*G01N 35/00* (2006.01)

(52) U.S. Cl.
CPC ......... *G01N 35/04* (2013.01); *G01N 35/0099* (2013.01); *G01N 2035/041* (2013.01); *G01N 2035/0493* (2013.01)

(58) Field of Classification Search
CPC ..... G01N 2035/041; G01N 2035/0493; G01N 2035/0494; G01N 35/10; G01N 35/1009;
(Continued)

(56) References Cited

U.S. PATENT DOCUMENTS 5,305,650 A * 4/1994 Koike ...................... G01N 1/28
73/864.21
5,455,006 A * 10/1995 Aota ...................... G01N 35/04
422/63
(Continued)

FOREIGN PATENT DOCUMENTS

CN  101311700 A  11/2008
CN  102112881 A  6/2011
(Continued)

OTHER PUBLICATIONS

A copy of the Chinese office action (CNOA) dated Apr. 28, 2019 in a counterpart Chinese patent application.
(Continued)

*Primary Examiner* — Brian R Gordon
(74) *Attorney, Agent, or Firm* — Metrolex IP Law Group, PLLC

(57) ABSTRACT

A sample measurement apparatus according to one or more embodiments includes a processing unit that aspirates a sample inside a sample container and measures the sample; a transfer unit that includes a holder to hold the sample container, and that picks up the sample container from a rack capable of storing the sample containers at storage positions on a row and transfers the sample container to the processing unit; and a detection unit that is attached to the holder and is movable integrally with the holder, and that detects whether or not there is the sample container at each of the storage positions.

16 Claims, 11 Drawing Sheets

(58) Field of Classification Search
CPC ............... G01N 35/1016; G01N 35/04; G01N 35/0099; B01L 9/56; B01L 9/50
See application file for complete search history.

(56) References Cited

U.S. PATENT DOCUMENTS

| | | | | |
|---|---|---|---|---|
| 6,060,022 | A * | 5/2000 | Pang | G01N 35/0095 422/63 |
| 6,293,750 | B1 * | 9/2001 | Cohen | G01N 35/0099 414/744.4 |
| 6,586,255 | B1 * | 7/2003 | Hubert | G01N 35/0099 422/504 |
| 6,589,789 | B1 * | 7/2003 | Hubert | G01N 35/0099 422/504 |
| 6,919,044 | B1 * | 7/2005 | Shibata | G01N 35/0092 422/63 |
| 7,141,213 | B1 * | 11/2006 | Pang | G01N 35/0095 422/65 |
| 8,142,740 | B2 * | 3/2012 | Self | B01L 9/06 422/561 |
| 8,956,568 | B2 * | 2/2015 | Ohiso | G01N 35/04 422/63 |
| 9,085,413 | B2 * | 7/2015 | Rosmarin | G01N 35/0099 |
| 9,164,113 | B2 * | 10/2015 | Friedman | G01N 35/0099 |
| 9,534,885 | B2 * | 1/2017 | Klinec | G01F 23/2921 |
| 9,670,044 | B2 * | 6/2017 | Weber | B67B 7/182 |
| 9,733,161 | B2 * | 8/2017 | Nagai | G01N 1/28 |
| 9,791,577 | B2 * | 10/2017 | Hanaya | G01N 35/04 |
| 9,835,639 | B2 * | 12/2017 | Oguri | B25J 15/08 |
| 9,903,881 | B2 * | 2/2018 | Hanaya | G01N 35/04 |
| 10,234,364 | B2 * | 3/2019 | Nagai | G01N 1/28 |
| 10,274,506 | B2 * | 4/2019 | Noda | G01N 35/025 |
| 10,402,614 | B2 * | 9/2019 | Itoh | G06K 7/1413 |
| 10,551,398 | B2 * | 2/2020 | Tamura | G01N 35/04 |
| 10,613,108 | B2 * | 4/2020 | Mori | G01N 35/0099 |
| 10,723,552 | B2 * | 7/2020 | Tatsutani | G01N 35/00871 |
| 10,732,192 | B2 * | 8/2020 | Chida | B25J 15/0038 |
| 10,775,401 | B2 * | 9/2020 | Bryant | G01N 35/0099 |
| 2004/0134750 | A1 | 7/2004 | Luoma, II | |
| 2006/0148063 | A1 * | 7/2006 | Fauzzi | G01N 1/31 435/286.4 |
| 2007/0110627 | A1 | 5/2007 | Nagai et al. | |
| 2008/0019868 | A1 | 1/2008 | Okumoto et al. | |
| 2008/0053790 | A1 | 3/2008 | Itoh | |
| 2009/0142844 | A1 * | 6/2009 | Le Comte | G01N 35/00594 436/8 |
| 2011/0116971 | A1 | 5/2011 | Nagai et al. | |
| 2011/0158850 | A1 | 6/2011 | Pedrazzini | |
| 2013/0019697 | A1 | 1/2013 | McKeen et al. | |
| 2013/0209210 | A1 | 8/2013 | Nuotio | |
| 2014/0036276 | A1 * | 2/2014 | Gross | G01N 35/00732 356/614 |
| 2015/0185120 | A1 | 7/2015 | Nagai et al. | |

FOREIGN PATENT DOCUMENTS

| | | |
|---|---|---|
| CN | 203191387 U | 9/2013 |
| CN | 104749387 A | 7/2015 |
| EP | 2889627 A1 | 7/2015 |
| JP | H05-032390 A | 2/1993 |
| JP | H06-130067 A | 5/1994 |
| JP | H08-094768 A | 4/1996 |
| JP | 2007-139463 A | 6/2007 |
| JP | 2007-524842 A | 8/2007 |
| JP | 2008-26051 A | 2/2008 |
| JP | 2008-58202 A | 3/2008 |
| JP | 2009-216410 A | 9/2009 |
| WO | 2010/015486 A1 | 2/2010 |

OTHER PUBLICATIONS

A copy of the Office Action dated Jul. 2, 2020 in a counterpart Chinese patent application.

Office Action dated Sep. 23, 2020 in a counterpart Chinese patent application.

* cited by examiner

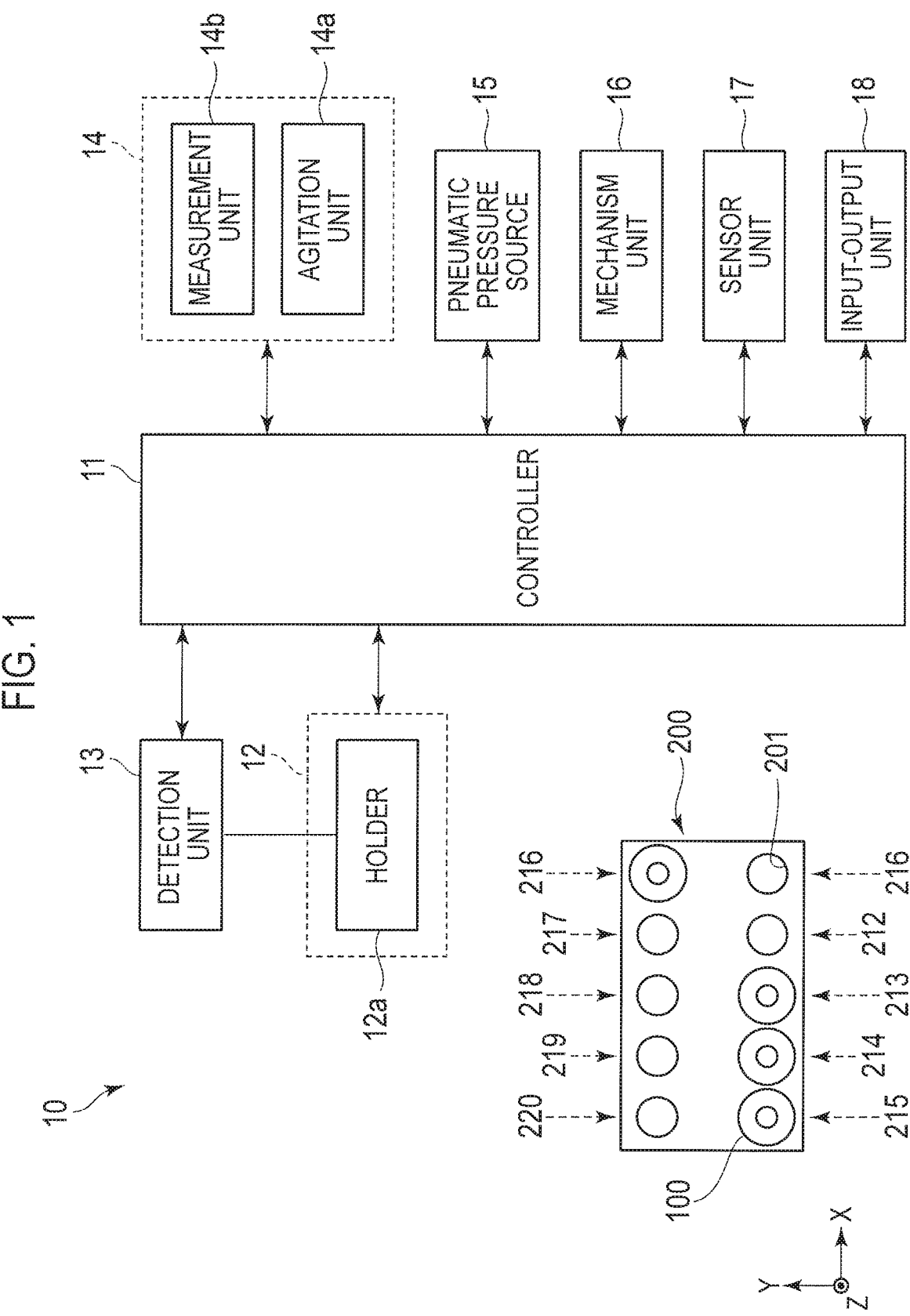

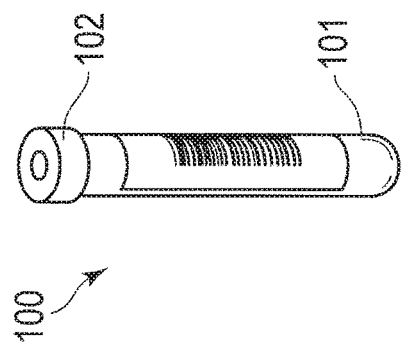
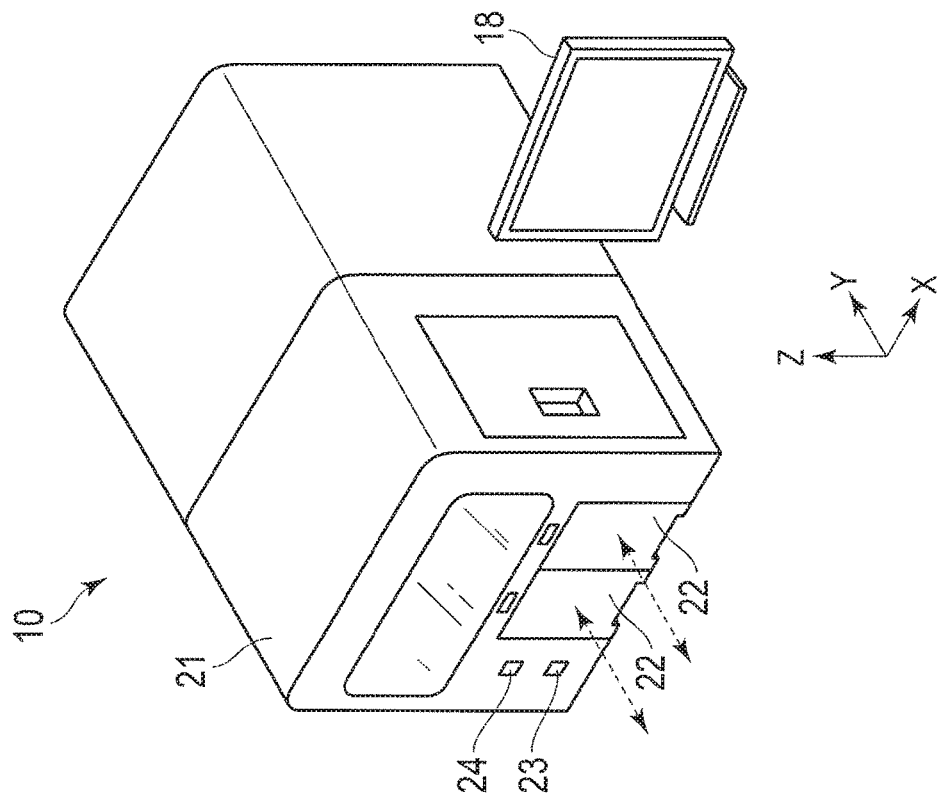
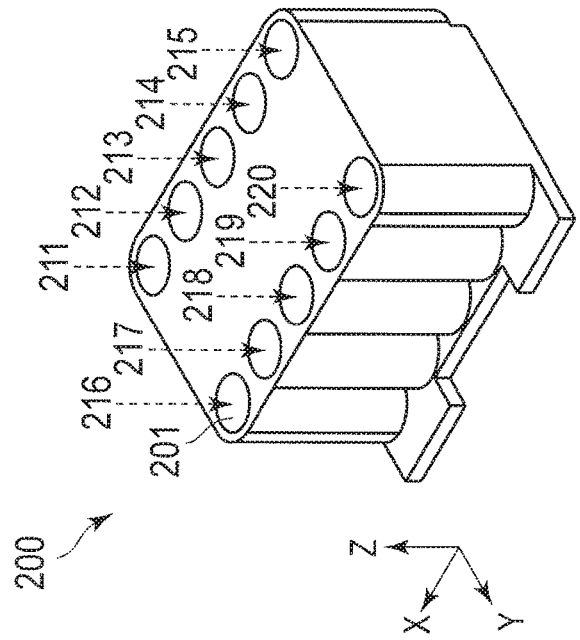

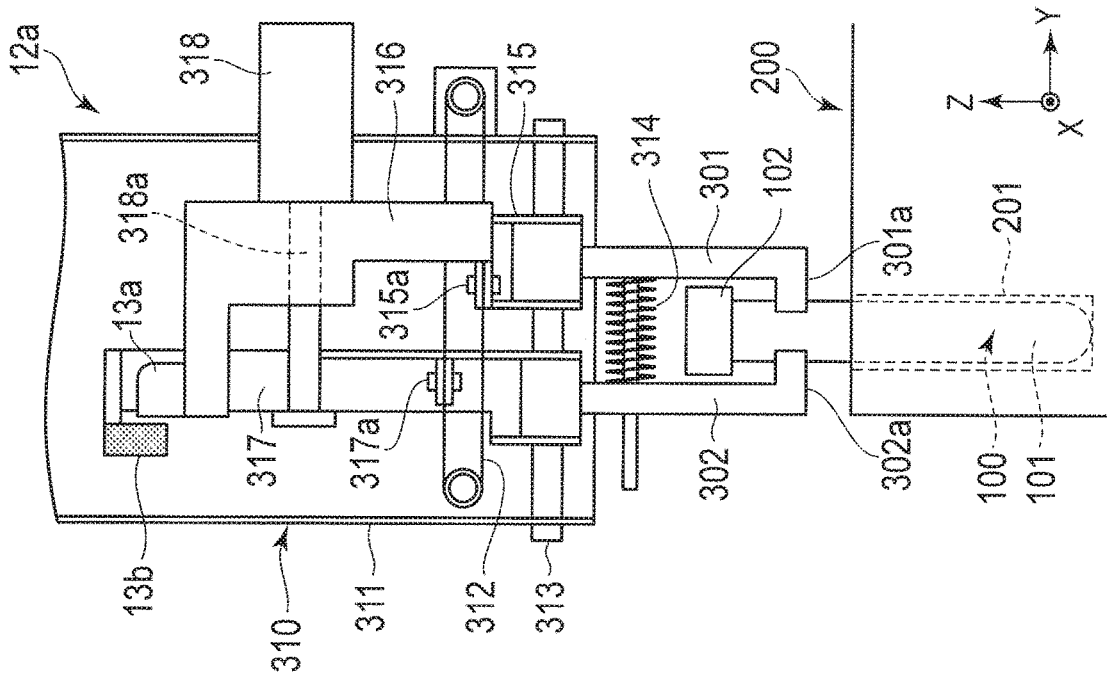
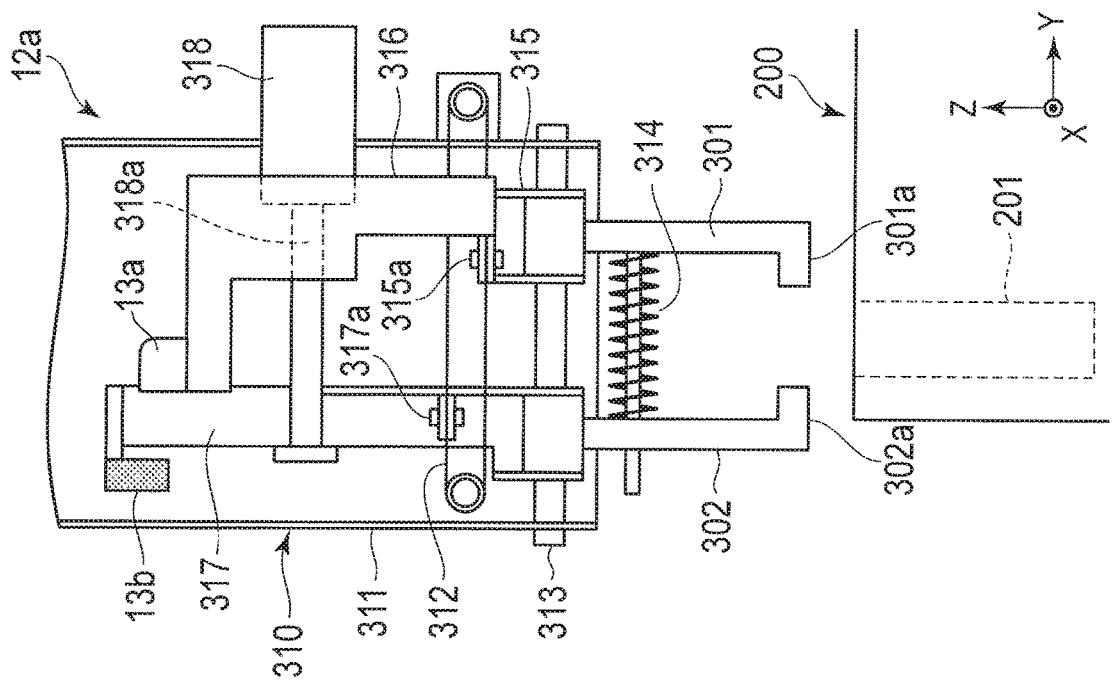

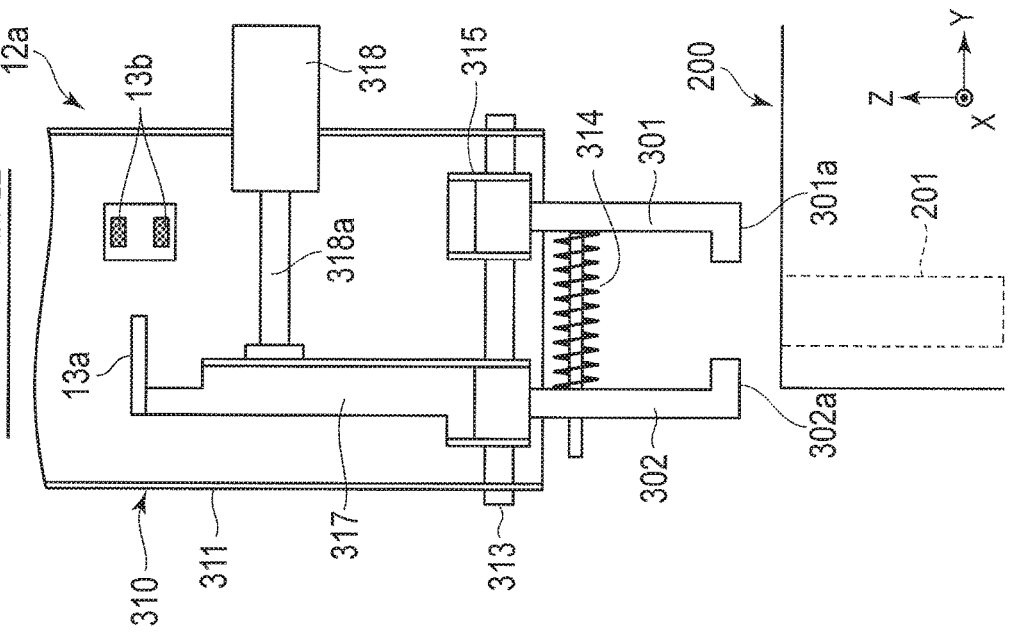
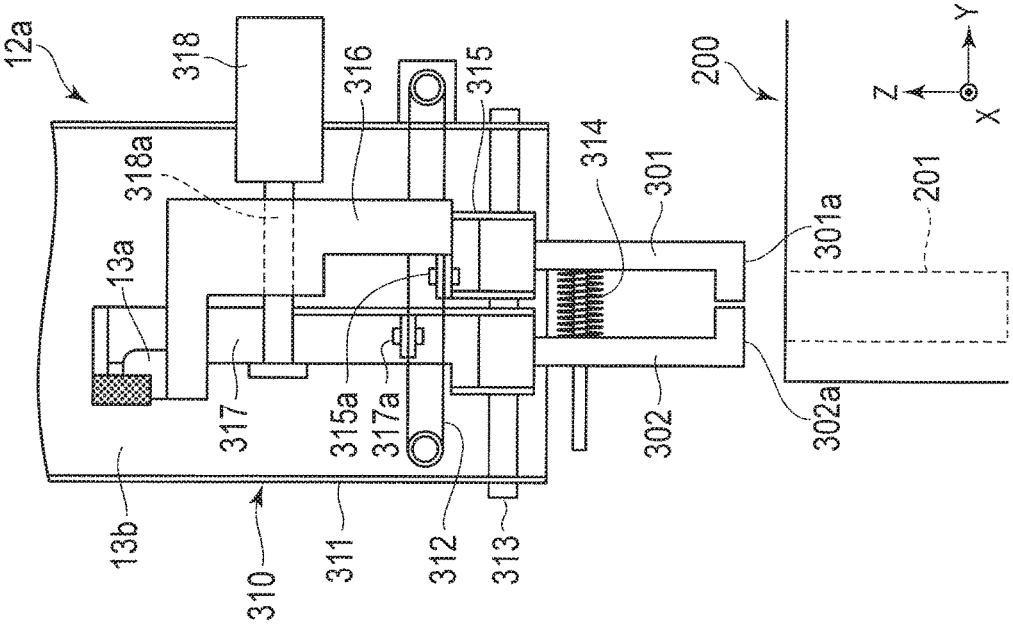

MEASUREMENT PROCESSING

ANALYSIS PROCESSING

SAMPLE MEASUREMENT APPARATUS AND METHOD OF MEASURING SAMPLES

CROSS REFERENCE TO RELATED APPLICATIONS

This application is a continuation application of International Application No. PCT/JP2015/081532, filed on Nov. 10, 2015, entitled "SAMPLE MEASUREMENT APPARATUS AND METHOD OF MEASURING SAMPLES", which claims priority based on the Article 8 of Patent Cooperation Treaty from prior Japanese Patent Applications No. 2014-232239, filed on Nov. 14, 2014, the entire contents of which are incorporated herein by reference.

BACKGROUND

This disclosure relates to a sample measurement apparatus and a method of measuring samples.

There is a sample measurement apparatus which picks up a sample container from a holding stand capable of holding multiple sample containers and transfers the sample container to a processing unit. For example, in a specimen analysis apparatus described in Japanese Patent Application Publication No. 2007-139463 (Patent Literature 1), a holder holds a specimen container set on a holding stand and transfers the specimen container thus held to an agitation position. When a sensor detects that the specimen container is being held by the holder before reaching the agitation position, the specimen container is turned over for agitation, and set on a specimen setting part. Then, an aspiration unit aspirates a specimen inside the specimen container. If the holder is not holding a specimen container, the holder picks up another specimen container at a different position.

SUMMARY

A sample measurement apparatus according to one or more embodiments may include: a processing unit that aspirates a sample inside a sample container and measures the sample; a transfer unit that includes a holder to hold the sample container, and that picks up the sample container from a rack capable of storing the sample containers at storage positions on a row and transfers the sample container to the processing unit; and a detection unit that is attached to the holder and is movable integrally with the holder, and that detects whether or not there is the sample container at each of the storage positions.

A method of measuring samples according to one or more embodiments may include: causing a holder for holding a sample container to move to a point above a first storage position on a rack capable of storing the sample containers at storage positions on a row; causing a detection unit that is attached to the holder and is movable integrally with the holder to detect whether or not there is the sample container at the first storage position; if the detection unit located at a point above the first storage position detects that there is the sample container at the first storage position, causing the transfer unit to transfer the sample container from the first storage position to a measurement unit; and if the detection unit located at the point above the first storage position detects that there is no sample container at the first storage position, directly sending the holder from the point above the first storage position to a point above a second storage position arranged on the same row as the first storage position, and causing the detection unit to detect whether or not there is the sample container at the second storage position.

A sample measurement apparatus according to one or more embodiments may include: a measurement unit that measures a sample in a sample container; a holder that moves between the measurement unit and storage positions on a rack at which the sample containers are stored and that picks up and holds the sample container stored at one of the storage positions; a transfer unit that transfers the sample container held by the holder to the measurement unit; and a detection unit that is movable integrally with the holder while keeping a relative positional relationship between the detection unit and the holder, and that detects whether or not there is the sample container at each of the storage positions.

BRIEF DESCRIPTION OF DRAWINGS

FIG. 1 is a block diagram illustrating a configuration of a sample measurement apparatus according to one or more embodiments;

FIGS. 2A and 2B are diagrams illustrating external appearances of a sample container and a rack according to one or more embodiments, respectively, and FIG. 2C is a diagram illustrating an external appearance of the sample measurement apparatus according to one or more embodiments;

FIGS. 4A and 4B are diagrams of a holder according to one or more embodiments when viewed in a negative X-axis direction;

FIG. 5A is a schematic diagram of the holder according to one or more embodiments when viewed in the negative X-axis direction, and FIG. 5B is a schematic diagram of a holder according to a modified example when viewed in the negative X-axis direction;

Figure 3:
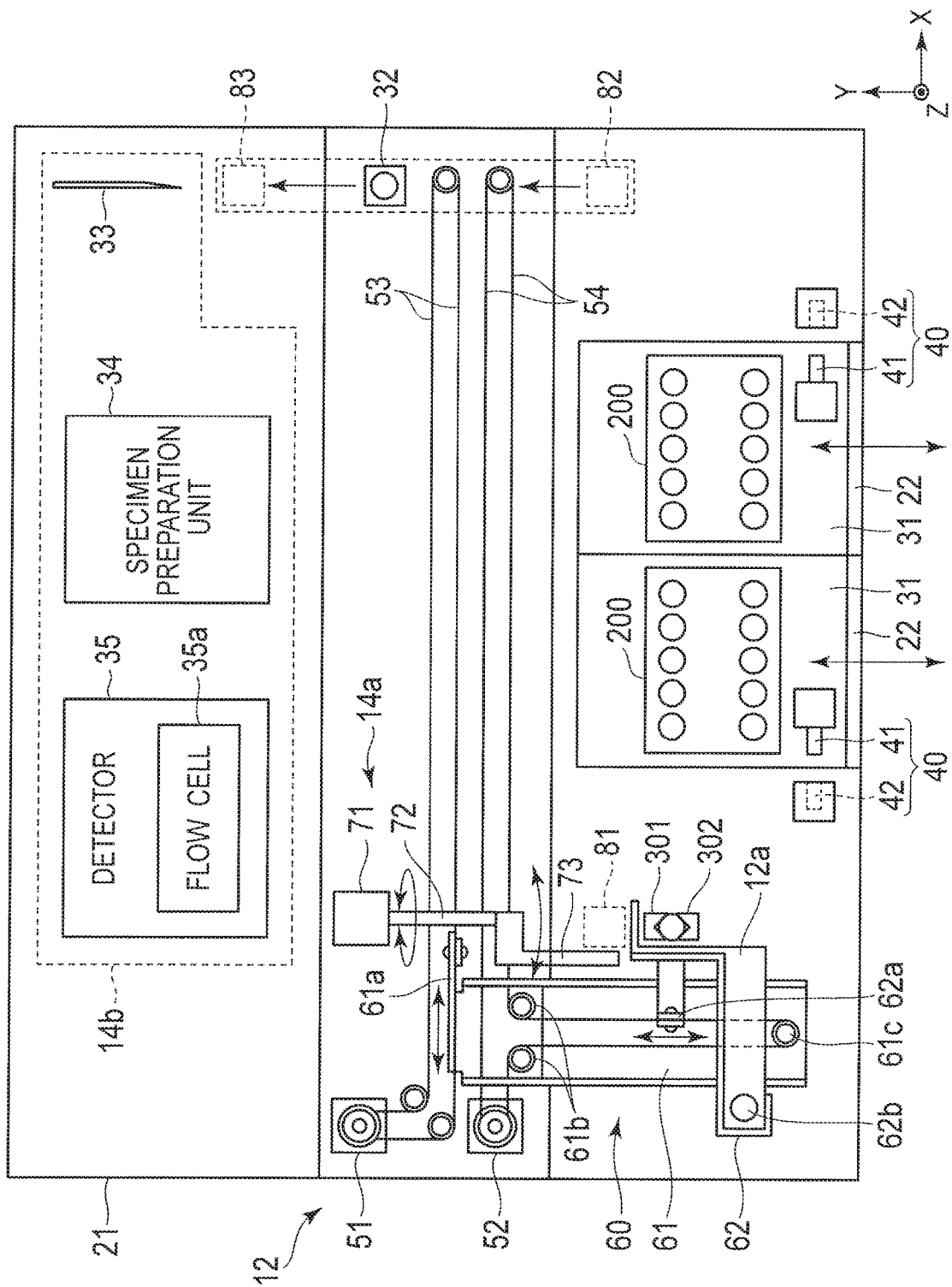
FIG. 3 is a schematic diagram of the inside of a housing of the sample measurement apparatus according to one or more embodiments when viewed from above.

Note that the drawings are devoted to explanation and do not limit the scope of the invention.

DETAILED DESCRIPTIONS

Embodiments are explained with reference to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on one or more embodiments. For this reason, specific dimensions and the like should be interpreted with the following descriptions taken into consideration. In addition, the drawings may include parts whose dimensional relationship and ratios are different from one drawing to another.

One or more embodiments to be described later are directed to an apparatus which detects blood cells and the like contained in a blood sample stored in a sample container and performs blood-related tests and analysis. Note that one or more embodiments are applicable to an apparatus which performs processing on a blood sample stored in a sample container, and that the sample to be processed may be other than a blood sample.

As illustrated in FIG. 1, sample measurement apparatus 10 includes controller 11, transfer unit 12, detection unit 13, processing unit 14, pneumatic pressure source 15, mechanism unit 16, sensor unit 17, and input-output unit 18. The units of sample measurement apparatus 10 except for input-output unit 18 are housed in housing 21 illustrated in FIG. 2C. Sample measurement apparatus 10 also includes drawers 31 illustrated in FIG. 3. Rack 200, which can store sample containers 100 in rows, is set on each of drawers 31.

As illustrated in FIG. 2A, sample container 100 includes body part 101 and cover part 102. Body part 101 is a tubular container and has an opening formed in an upper end thereof. Body part 101 houses a sample, and the opening in the upper end of body part 101 is sealed with cover part 102.

As illustrated in FIG. 1 and FIG. 2B, rack 200 includes ten storage sections 201 formed for holding sample containers 100 vertically. FIG. 1 and FIG. 2B each illustrate coordinate axes of FIG. 3 when racks 200 are set on drawers 31. Hereinafter, positions of ten storage sections 201 are referred to as storage positions 211 to 220. Storage positions 211 to 215 are arranged in an X-axis direction on the negative Y-axis side of rack 200, while storage positions 216 to 220 are arranged in the X-axis direction on the positive Y-axis side of rack 200. In rack 200, the number of rows of the storage positions provided may be one, or three or more.

Back to FIG. 1, controller 11 receives signals outputted by the units of sample measurement apparatus 10, and controls the units of sample measurement apparatus 10. Transfer unit 12 includes holder 12a. Holder 12a holds sample container 100. Transfer unit 12 picks up sample containers 100 from rack 200 using holder 12a, and transfers the sample containers to processing unit 14. Detection unit 13 is integrally and movably attached to holder 12a. Detection unit 13 moves integrally with holder 12a while keeping a relative positional relationship between Detection unit 13 and holder 12a. Detection unit 13 includes operating unit 13a and detector 13b illustrated in FIG. 4A, and detects whether or not there are sample containers 100 at storage positions 211 to 220.

Processing unit 14 performs processing on samples inside sample containers 100. Processing unit 14 includes agitation unit 14a and measurement unit 14b. Agitation unit 14a performs an agitation operation on sample containers 100. Measurement unit 14b aspirates the samples inside sample containers 100 and performs measurement on the samples. Transfer unit 12 transfers sample containers 100 from rack 200 to measurement unit 14b via agitation unit 14a. Pneumatic pressure source 15 sends out air to and sucks in air from the units in sample measurement apparatus 10 which operate using air. Mechanism unit 16 includes other mechanisms of sample measurement apparatus 10. Sensor unit 17 includes sensors installed inside sample measurement apparatus 10. Input-output unit 18 receives an input by an operator and outputs information. Input-output unit 18 is a touch-panel-type display.

With reference to FIG. 1, a description of provided for an overview of processing to transfer sample container 100.

Controller 11 causes transfer unit 12 to transfer multiple sample containers 100 stored on rack 200 in a predetermined order. To be more specific, controller 11 causes transfer unit 12 to pick up multiple sample containers 100 stored at storage positions 211 to 220 of rack 200 in the order of storage positions 211 to 220, and to transfer picked-up sample containers 100.

When controller 11 sets a first storage position as a transfer target, controller 11 moves holder 12a to a point above the first storage position, and causes detection unit 13 to detect, at a point above the first storage position, whether or not there is sample container 100 at the first storage position. If there is sample container 100 at the first storage position, controller 11 causes transfer unit 12 to transfer sample container 100 from the first storage position to processing unit 14. If there is no sample container 100 at the first storage position, controller 11 sets a second storage position, which is arranged on the same row as that of the first storage position and is not yet set as the transfer target, as the transfer target. To be more specific, if the first storage position is any one of storage positions 211 to 214 and 216 to 219, the second storage position is a storage position located next to the first storage position in the negative X-axis direction. In such a case, controller 11 sends holder 12a directly to a point above the second storage position from a point above the first storage position, and causes detection unit 13 to detect whether or not there is sample container 100 at the second storage position.

If there is no second storage position in a first row containing the first storage position, controller 11 sets a predetermined storage position in a second row different from the first row as the second storage position. To be more specific, if the first storage position is storage position 215, there is no storage position yet to be set as the transfer target in the first row, i.e., the row of storage positions 211 to 215 containing storage position 215. Thus, second storage position is set to storage position 216 in the second row, i.e., the row of storage positions 216 to 220 different from the row containing storage position 215. In this case, controller 11 sends holder 12a to a point above the second storage position from a point above the first storage position, and causes detection unit 13 to detect whether or not there is sample container 100 at the second storage position.

If the first storage position is storage position 220 and there is no sample container 100 at the first storage position, this means that initial tests on all sample containers 100 held on rack 200 have finished. After that, retests on sample containers 100 held on rack 200 are performed when needed, and processing on rack 200 is terminated. Detailed description on the processing to transfer sample containers 100 is provided later with reference to flowcharts.

As illustrated in FIG. 2C, a front surface housing 21 includes two panels 22, power button 23, and start button 24. In the case of measurement of a sample, an operator turns on sample measurement apparatus 10 by pressing power button 23. Drawer 31 illustrated in FIG. 3 is connected to each of two panels 22 on the positive Y-axis side. The operator draws drawers 31 toward the negative Y-axis side by pulling panels 22 toward the negative Y-axis side. The operator sets racks 200, holding sample containers 100, on drawers 31. The operator pushes panels 22 toward the positive Y-axis side and presses start button 24 to start processing on sample containers 100.

As illustrated in FIG. 3, housing 21 has transfer unit 12, agitation unit 14a, measurement unit 14b, two drawers 31, container set unit 32, piercer 33, and two lock units 40 installed therein. Measurement unit 14b includes piercer 33, specimen preparation unit 34, and detector 35. Controller 11, detection unit 13, mechanism unit 16, and sensor unit 17 are also installed inside housing 21, but their illustration is omitted for convenience. As illustrated in FIG. 3, a positive X-axis direction is a rightward direction, a positive Y-axis direction is a rearward direction, and a positive Z-axis direction is an upward direction.

Two drawers 31 are arranged on the left and right. Each of panels 22 is connected to an end portion in the front of corresponding drawer 31. When the operator moves panels 22 in a front-rear direction, drawers 31 move in the front-rear direction together with panels 22. Each drawer 31 has a hollow portion formed approximately at a center thereof, to which rack 200 can be detachably attached. A not-illustrated sensor is installed to the hollow portion, and this sensor detects whether or not rack 200 is set on drawer 31. Rack 200 is not necessarily attachable to and detachable from drawer 31. Instead, rack 200 may be fixed to drawer 31 in advance. A not-illustrated sensor is installed in the rear of each drawer 31 pushed to the rear, and this sensor detects whether or not drawer 31 is pushed to the rear.

Each of lock units 40 includes rod member 41 and hole member 42. Rod member 41 is provided to each drawer 31, and hole member 42 is installed inside housing 21. When processing on rack 200 set on drawer 31 is to be performed, drawer 31 is locked so that rack 200 is not erroneously drawn toward the front. To be more specific, rod member 41 provided to drawer 31 is driven by a not-illustrated drive unit in the X-axis direction, and is inserted into a hole formed in hole member 42. Thus, the drawing of individual drawers 31 arranged on the left and right is regulated. Also, when rod member 41 is driven in the direction opposite to that in the case of locking drawer 31, drawer 31 is unlocked so that drawer 31 can be drawn in a negative Y-axis direction.

Transfer unit 12 includes motors 51 and 52, belts 53 and 54, and move unit 60. Move unit 60 includes left-right move unit 61, front-rear move unit 62, and holder 12a. Each of motors 51 and 52 is a stepping motor.

Left-right move unit 61 moves in the left-right direction while being supported by a not-illustrated guide which is provided inside housing 21 and extends in the left-right direction. Motor 51 drives belt 53 wound around pulleys, disposed on the left and right inside housing 21, in the left-right direction. Fixed to belt 53 is attachment piece 61a of left-right move unit 61. Thus, left-right move unit 61 is allowed to move in the left-right direction in conjunction with belt 53.

Front-rear move unit 62 moves in the front-rear direction while being supported by a not-illustrated guide which is provided to left-right move unit 61 and extends frontward and rearward. Motor 52 drives belt 54 wound around pulleys, disposed on the left and right inside housing 21, in the left-right direction. Portions of belt 54 are bent forward at pulleys 61b provided to left-right move unit 61, and a portion of belt 54 is wound around pulley 61c provided in the front of left-right move unit 61. Attachment piece 62a of front-rear move unit 62 is attached to a portion of belt 54 between pulley 61c and one of pulleys 61b. Thus, front-rear move unit 62 is allowed to move in the front-rear direction in conjunction with belt 54.

Holder 12a is supported by front-rear move unit 62 through cylinder 62b of front-rear move unit 62. When cylinder 62b is driven, holder 12a moves in a Z-axis direction. Holder 12a includes hands 301 and 302. Holder 12a grasps sample container 100 by driving hands 301 and 302 in a direction of approaching each other and a direction of receding from each other.

Transfer unit 12 configured as above allows hands 301 and 302 to freely move in the X-, Y-, and Z-axis directions inside housing 21. Thus, sample containers 100 are grasped by hands 301 and 302, and are freely transferred in the X-, Y-, and Z-axis directions inside housing 21. A detailed configuration of holder 12a is described later with reference to FIGS. 4A and 4B and FIG. 5A.

Installed inside housing 21 are not-illustrated through-beam sensors for detecting that left-right move unit 61 is positioned at a leftmost end or a rightmost end. Installed to left-right move unit 61 is a not-illustrated through-beam sensor for detecting that front-rear move unit 62 is positioned at a rearmost point. Using detection signals of these sensors and the number of steps of each of motors 51 and 52, controller 11 can acquire positions of hands 301 and 302 in an X-Y plane. In addition, installed to front-rear move unit 62 is a not-illustrated through-beam sensor for detecting that holder 12a is positioned at a lowermost point.

Agitation unit 14a includes motor 71, shaft 72, and contact member 73. Shaft 72 extends in the front-rear direction, and an end portion in the rear of shaft 72 is connected to motor 71. Contact member 73 is fixed to an end portion in the front of shaft 72.

When hands 301 and 302 of holder 12a pick up sample container 100 from rack 200 and position the sample container at position 81, motor 71 turns contact member 73 through shaft 72. This causes contact member 73 to push hand 301 from the negative X-axis side and thus hand 301 to turn over sample container 100 positioned at position 81 to agitate the sample inside sample container 100. To return sample container 100 to a vertical state, motor 71 turns contact member 73 through shaft 72 in the opposite direction. Thus, contact member 73 is detached from hand 301, and hands 301 and 302 grasping sample container 100 are returned to the vertical state due to their own weights.

When agitation unit 14a finishes with agitation processing at position 81, transfer unit 12 sets sample container 100 on container set unit 32 positioned at position 82. Sample container 100 is transported to position 83 by container set unit 32. When sample container 100 is positioned at position 83, piercer 33 aspirates the sample from sample container 100.

When the aspiration of the sample finishes, container set unit 32 transports sample container 100 forward to position the sample container at position 82. After that, sample container 100 is returned to the original storage position in original rack 200 by transfer unit 12. As described above, sample containers 100 held on rack 200 are picked up in sequence, and piercer 33 aspirates the samples therein.

Sample containers 100 are transferred as described above so that rack 200 on the opposite side of rack 200 to be processed is not prevented from being drawn. To be more specific, in the X-Y plane, sample container 100 is transferred such that hands 301 and 302 do not enter a region of rack 200 on the opposite side of rack 200 to be processed and a region in front of rack 200 on the opposite side of rack 200 to be processed. Thus, the operator is allowed to draw drawer 31 on the opposite side of drawer 31 on which rack 200 to be processed is set, and to set rack 200 on this drawer 31.

The sample aspirated by piercer 33 is transferred to specimen preparation unit 34. Specimen preparation unit 34 prepares a measurement specimen by mixing the sample and a reagent. The measurement specimen is allowed to flow into flow cell 35a of detector 35. Detector 35 irradiates the measurement specimen flowing through flow cell 35a with a laser beam, and receives, using a photodetector, light produced from particles contained in the measurement specimen. Controller 11 analyzes the sample based on an output signal of the photodetector, and displays the analysis results on input-output unit 18.

As illustrated in FIG. 4A, holder 12a includes hands 301 and 302 and open-close mechanism 310. Formed at lower ends of hands 301 and 302 are first claw 301a and second claw 302a, respectively. Hands 301 and 302 use first claw 301a and second claw 302a to grasp sample container 100. Open-close mechanism 310 includes substrate 311, belt 312, shaft 313, spring 314, members 315 to 317, and cylinder 318. Open-close mechanism 310 opens and closes hands 301 and 302. Detection unit 13 includes operating unit 13a and detector 13b.

Substrate 311 is moved in the Z-axis direction by cylinder 62b illustrated in FIG. 3. Belt 312 is wound around pulleys disposed on the positive Y-axis side and the negative Y-axis side of substrate 311. Shaft 313 is fixed to substrate 311. Hands 301 and 302 are installed on shaft 313 so as to be turnable around shaft 313 as the center of turn. Spring 314 is interposed between hands 301 and 302. Spring 314 applies a force to hands 301 and 302 in a direction of extending the distance between hands 301 and 302.

Two surfaces parallel to an X-Z plane are formed on member 315, and hand 301 is sandwiched by these two surfaces. Attachment piece 315a of member 315 is fixed to a lower portion of belt 312. Member 316 is fixed to an upper end of member 315. Operating unit 13a is installed on the upper side of an end portion on the negative Y-axis side of member 316. Operating unit 13a is a plate-shaped member parallel to a Y-Z plane. Two surfaces parallel to the X-Z plane are formed on member 317, and hand 302 is sandwiched by these two surfaces. Attachment piece 317a of member 317 is fixed to an upper side portion of belt 312. Detector 13b is installed on an upper end of member 317. Detector 13b is a through-beam sensor including a light emitter and a light receiver. The light emitter and the light receiver of detector 13b are arranged in the X-axis direction.

Cylinder 318 is fixed to substrate 311. An end portion on the negative Y-axis side of rod 318a of cylinder 318 is fixed to member 317.

When cylinder 318 is supplied with a negative pressure in the state of FIG. 4A, rod 318a moves in the positive Y-axis direction. This causes member 317, hand 302, and detector 13b to move in the positive Y-axis direction. At that moment, attachment piece 317a moves in the positive Y-axis direction. For this reason, the upper side of belt 312 moves in the positive Y-axis direction, and the lower side of belt 312 moves in the negative Y-axis direction. Thus, members 315 and 316, hand 301, and operating unit 13a move in the negative Y-axis direction. As a result, when cylinder 318 is supplied with a negative pressure in the state of FIG. 4A, first claw 301a and second claw 302a approach each other, and operating unit 13a and detector 13b approach each other.

After cylinder 318 is supplied with a negative pressure in the state of FIG. 4A and then cylinder 318 is supplied with a positive pressure, rod 318a moves in the negative Y-axis direction. This causes member 317, hand 302, and detector 13b to move in the negative Y-axis direction. At that moment, attachment piece 317a moves in the negative Y-axis direction. For this reason, the upper side of belt 312 moves in the negative Y-axis direction, and the lower side of belt 312 moves in the positive Y-axis direction. Thus, members 315 and 316, hand 301, and operating unit 13a move in the positive Y-axis direction. As a result, after cylinder 318 is supplied with a negative pressure in the state of FIG. 4A and then cylinder 318 is supplied with a positive pressure, first claw 301a and second claw 302a recede from each other, and operating unit 13a and detector 13b recede from each other.

As described above, open-close mechanism 310 opens and closes hands 301 and 302 to move first claw 301a and second claw 302a. Operating unit 13a is integrally attached to hand 301 with members 315 and 316 in between, and moves together with the open-close operation of hand 301. Detector 13b is integrally attached to hand 302 with member 317 in between, and moves together with the open-close operation of hand 302. Thus, operating unit 13a moves together with the open-close operation of first claw 301a, and detector 13b moves together with the open-close operation of second claw 302a.

Next, a description is provided for the grasping of sample containers 100 and detection as to whether or not there are sample containers 100. When sample container 100 is to be grasped and detection is to be made as to whether or not there is sample container 100, holder 12a is positioned above the storage position of the transfer target while hands 301 and 302 are in an open state, as illustrated in FIG. 4A.

If there is sample container 100 at the storage position when cylinder 318 is supplied with a negative pressure above this storage position of the transfer target while in the state of FIG. 4A, first claw 301a and second claw 302a grasp sample container 100, as illustrated in FIG. 4B. At that moment, a position of operating unit 13a and a position of detector 13b do not overlap each other in the Y-Z plane. Thus, controller 11 can determine that there is sample container 100 at the storage position of the transfer target based on the fact that cylinder 318 was supplied with a negative pressure and detector 13b does not detect operating unit 13a. After rod 318a moves in the negative Y-axis direction while in the state of FIG. 4B, hands 301 and 302 are returned to the state of FIG. 4A. As a result, the grasping of sample container 100 is released.

The grasping force of sample container 100 is strengthened in the case where sample container 100 is grasped after cylinder 318 is supplied with a negative pressure compared to the case where sample container 100 is grasped after cylinder 318 is supplied with a positive pressure. Thus, it is possible to reliably grasp sample container 100.

If there is no sample container 100 at the storage position when cylinder 318 is supplied with a negative pressure above this storage position of the transfer target while in the state of FIG. 4A, hand 301 and hand 302 are closed to have a width smaller than that of sample container 100, as illustrated in FIG. 5A. Here, operating unit 13a is positioned at a detection position of detector 13b. To be more specific, the position of operating unit 13a and the position of detector 13b overlap each other in the Y-Z plane, and operating unit 13a is positioned between the light emitter and the light receiver of detector 13b. Thus, controller 11 can determine that there is no sample container 100 at the storage position of the transfer target based on the fact that detector 13b detects operating unit 13a.

Since the opening and closing of hands 301 and 302 is detected when operating unit 13a interrupts the beam emitted from the light emitter of detector 13b, it is possible to detect, with a simple configuration, whether or not there is sample container 100. Since sample container 100 is detected by operating unit 13a and detector 13b which are configured to move together with the open-close operation of first claw 301a and second claw 302a, respectively, it is possible to more reliably detect whether or not there is sample container 100 compared to the case where a through-beam sensor installed on substrate 311 detects whether or not there is sample container 100.

Holder 12a may be configured as illustrated in FIG. 5B. In such a case, hand 301 and member 315 are installed on shaft 313 so as not to move in the Y-axis direction. Belt 312 and member 316 are omitted. Spring 314 applies a force to hands 301 and 302 in a direction of shortening the distance between hands 301 and 302. Operating unit 13a is installed on the upper end of member 317, and detector 13b is installed on substrate 311.

When cylinder 318 is supplied with a negative pressure in the state of FIG. 5B, rod 318a moves in the positive Y-axis direction. This causes member 317, hand 302, and operating unit 13a to move in the positive Y-axis direction. In this case as well, operating unit 13a is not positioned between the light emitter and the light receiver of detector 13b if there is sample container 100 between first claw 301a and second claw 302a. Operating unit 13a is positioned between the light emitter and the light receiver of detector 13b if there is no sample container 100 between first claw 301a and second claw 302a. Thus, it is possible to detect whether or not there is sample container 100 at the storage position of the transfer target.

In holder 12a illustrated in FIG. 5B, the position in the Y-axis direction of hand 301 is fixed. For this reason, when hands 301 and 302 are to grasp sample container 100, hand 301 is driven in the positive Y-axis direction and, in addition, holder 12a is driven in the negative Y-axis direction. Thus, both of hands 301 and 302 move to grasp sample container 100. As described above, in the configuration illustrated in FIG. 5B, it is necessary to drive not only hand 302 but also holder 12a in order to grasp sample container 100. Hence, the configuration of holder 12a illustrated in FIGS. 4A and 4B and FIG. 5A makes it possible to easily control the grasping operation of sample container 100 compared to the configuration of holder 12a illustrated in FIG. 5B.

In holder 12a illustrated in FIGS. 4A and 4B and FIG. 5A, detector 13b may be installed on member 316, and operating unit 13a may be installed on member 317. In holder 12a illustrated in FIG. 5B, detector 13b may be installed on the upper end of member 317, and operating unit 13a may be installed on substrate 311.

In holder 12a illustrated in FIGS. 4A and 4B and FIG. 5A and in holder 12a illustrated in FIG. 5B, detector 13b may be a reflective sensor. Alternatively, detector 13b may be a push-button sensor. If detector 13b is a push-button sensor, a button of detector 13b is pushed in by operating unit 13a when hands 301 and 302 are closed. Thus, as in the case of the foregoing discussion, it is possible to detect whether or not there is sample container 100 at the storage position of the transfer target.

Figure 6:
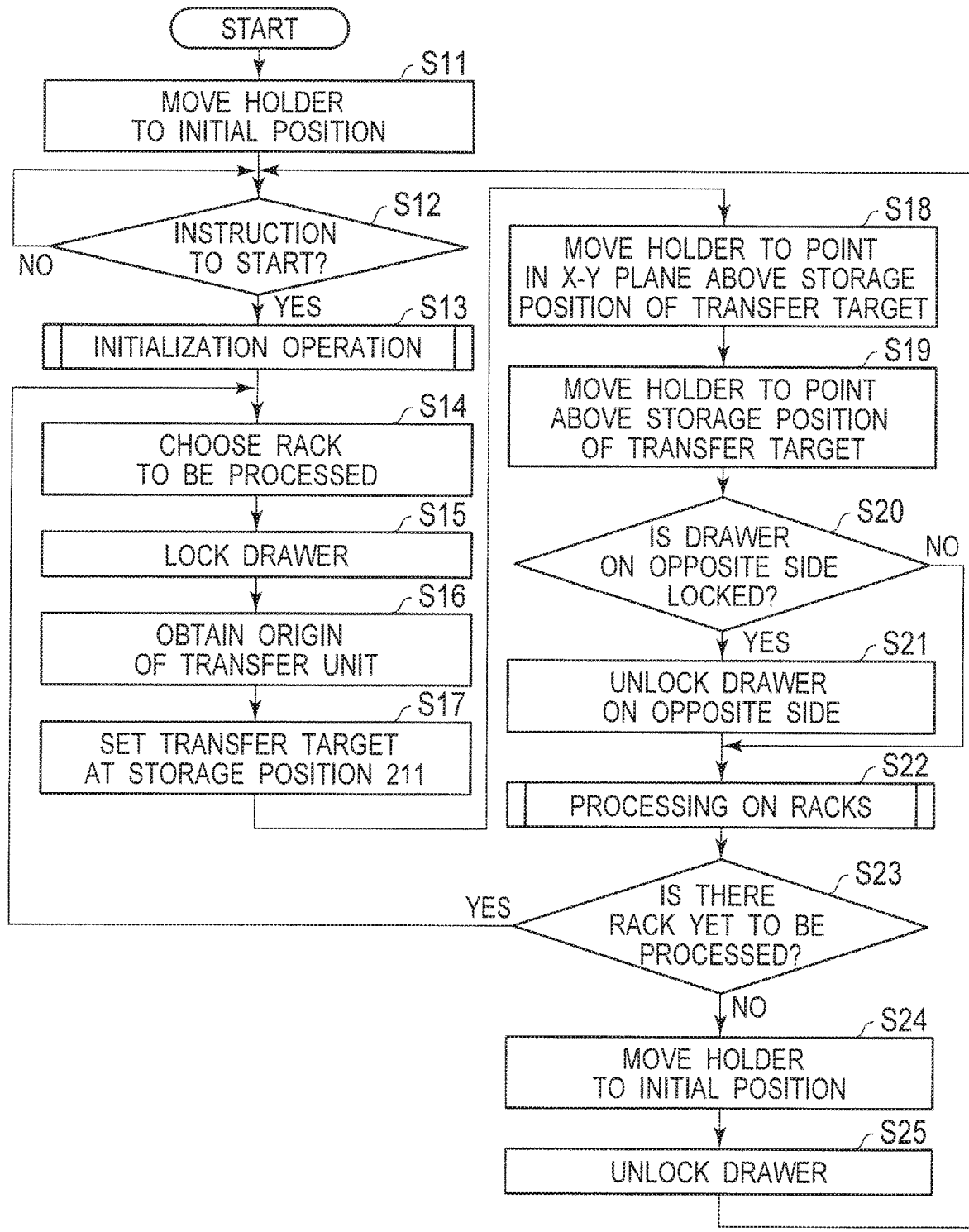
FIG. 6 is a flowchart illustrating processing by the sample measurement apparatus according to one or more embodiments.

Next, a description is provided for processing by sample measurement apparatus 10 with reference to a flowchart of FIG. 6. The processing illustrated in FIG. 6 is started when the power of sample measurement apparatus 10 is turned on.

At step S11, controller 11 moves holder 12a to an initial position. To be more specific, controller 11 causes left-right move unit 61 to move holder 12a to the leftmost side, causes front-rear move unit 62 to move holder 12a to the rearmost side, and causes cylinder 62b to move holder 12a to the uppermost side. When holder 12a is positioned at the initial position, hands 301 and 302 are positioned at position 81 in the X-Y plane.

At step S12, controller 11 determines whether or not a start instruction is made by start button 24. When the start instruction is made, controller 11 performs at step S13 an initialization operation for transfer unit 12 illustrated in FIG. 7.

Figure 7:
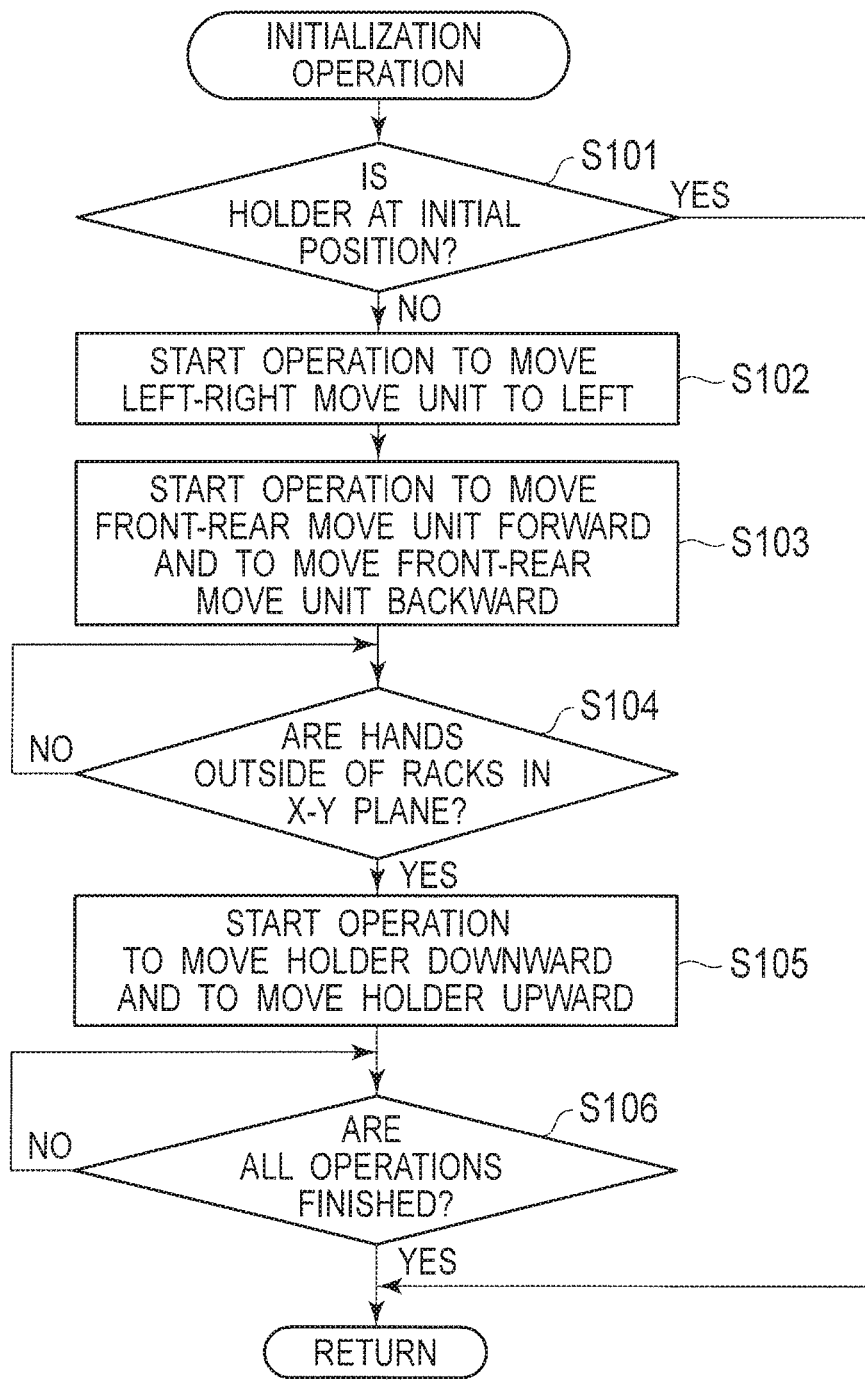
FIG. 7 is a flowchart illustrating an initialization operation according to one or more embodiments.

With reference to FIG. 7, when the initialization operation for transfer unit 12 is started, controller 11 determines at step S101 whether or not holder 12a is at the initial position. To be more specific, controller 11 detects with a sensor whether or not left-right move unit 61 is positioned on the leftmost side, and detects with a sensor whether or not front-rear move unit 62 is positioned on the rearmost side. Controller 11 determines that holder 12a is at the initial position if left-right move unit 61 is positioned on the leftmost side and front-rear move unit 62 is positioned on the rearmost side.

If holder 12a is not at the initial position, controller 11 performs the initialization operation at steps S102 to S106. If holder 12a is at the initial position, controller 11 does not perform the initialization operation at steps S102 to S106. As described above, it is possible to promptly start the processing at step S14 and the subsequent steps in FIG. 6 if the configuration is such that the initialization operation for transfer unit 12 is not performed in the case where holder 12a is at the initial position when the initialization operation for transfer unit 12 is to be performed.

At step S102, controller 11 starts an operation to move left-right move unit 61 to the leftmost side. At step S103, controller 11 starts an operation to move front-rear move unit 62 to the frontmost side, and then starts an operation to move front-rear move unit 62 to the rearmost side. Holder 12a starts moving to the left-rear side through steps S102 and S103. The operations started at steps S102 and S103 are performed such that hands 301 and 302 do not come into contact with racks 200 and sample container 100.

At step S104, controller 11 determines whether or not hands 301 and 302 have moved to the outside of both racks 200 in the X-Y plane after the operations started at steps S102 and S103. After hands 301 and 302 have moved to the outside of both racks 200 in the X-Y plane, controller 11 starts at step S105 an operation to move holder 12a to the lowermost side and the uppermost side. Controller 11 detects with a sensor whether or not holder 12a is positioned on the lowermost side. Step S105 allows controller 11 to acquire the position in an up-down direction of holder 12a, and then to position holder 12a on the uppermost side.

Note that at step S105, hands 301 and 302 start moving in the up-down direction after hands 301 and 302 have moved to the outside of both racks 200 in the X-Y plane. Besides, hands 301 and 302 are elevated in sample measurement apparatus 10 after hands 301 and 302 have moved to the outside of both racks 200 in the X-Y plane as in the case of steps S102 to S105, except when hands 301 and 302 pick up sample container 100 from rack 200. Thus, it is possible to prevent a situation where, when hands 301 and 302 are being elevated, hands 301 and 302 come into contact with sample container 100 stored on rack 200 and sample container 100 erroneously drawn in the upward direction.

At step S106, controller 11 determines whether or not all operations started at steps S102, S103, and S105 have finished. When all operations started at steps S102, S103, and S105 have finished, which means that holder 12a is positioned at the initial position, the initialization operation finishes.

Back to FIG. 6, at step S14, controller 11 chooses rack 200 to be processed. For example, if racks 200 set on both drawers 31 are yet to be processed, controller 11 selects rack 200 set on left drawer 31 as the processing target. If one of racks 200 set on left and right drawers 31 is yet to be processed, controller 11 selects rack 200 yet to be processed as the processing target. At step S15, controller 11 drives lock unit 40 to lock drawer 31 on which rack 200 to be processed is set.

At step S16, controller 11 obtains an origin of transfer unit 12. To be more specific, controller 11 causes left-right move unit 61 to move to the rightmost side, and causes front-rear move unit 62 to move to the rearmost side. A sensor detects that left-right move unit 61 is positioned on the rightmost side, and another sensor detects that front-rear move unit 62 is positioned on the rearmost side. When the origin of transfer unit 12 is obtained, hands 301 and 302 are positioned at position 82 in the X-Y plane. If the processing returns from later-described step S22 to step S14, where rack 200 to be processed moves from the right side to the left side, the processing at step S16 to obtain the origin is omitted.

At step S17, controller 11 sets the transfer target at storage position 211 of rack 200 to be processed. At step S18, controller 11 moves holder 12a in the X-axis direction and the Y-axis direction to move to a point in the X-Y plane above storage position 211 of the transfer target. Subsequently, at step S19, controller 11 causes holder 12a to move down and to move to a point above storage position 211 of the transfer target, as illustrated in FIG. 4A. In other words, at step S19, holder 12a is positioned above storage position 211 of the transfer target such that the position in the up-down direction of hands 301 and 302 is in alignment with a position which allows hands 301 and 302 to grasp body part 101 of sample container 100 stored at the storage position.

At step S20, controller 11 determines whether or not drawer 31 is locked on the opposite side of drawer 31 on which rack 200 to be processed is set. If drawer 31 on the opposite side is locked, controller 11 drives at step S21 lock unit 40 to unlock drawer 31 on the opposite side.

As described above, if rack 200 processed immediately before is set on drawer 31 on the opposite side, drawer 31 on the opposite side is unlocked after holder 12a moves to storage position 211 of rack 200 currently to be processed. In addition, at steps S24 and S25 to be described later, drawer 31 is unlocked after holder 12a moves to the initial position. In other words, after holder 12a recedes from rack 200 finished with the processing, drawer 31 on which rack 200 finished with the processing is set is unlocked. This makes it possible to reliably avoid a situation where drawer 31 is erroneously drawn during the processing, and hands 301 and 302 and rack 200 come into contact with one another.

At step S22, controller 11 performs processing on the racks, which is described later. This finishes processing on all sample containers 100 stored on rack 200 to be processed, and processing on rack 200 to be processed finishes. The processing on the racks is described later with reference to FIGS. 8 and 9.

At step S23, controller 11 determines whether or not rack 200 yet to be processed is set on drawer 31 on the opposite side. If rack 200 yet to be processed is set on drawer 31 on the opposite side, controller 11 returns the processing to step S14. After the processing is returned, controller 11 selects at step S14 rack 200 set on drawer 31 on the opposite side as the processing target. Then, controller 11 performs processing through steps S15 to S22, as mentioned above.

As described above, processing is not performed on sample containers 100 on rack 200 set in drawer 31 on one side until the processing is completed on all sample containers 100 on rack 200 set in drawer 31 on the other side. This makes it possible to freely draw drawer 31 the processing of which is yet to be started, and to set rack 200 on this drawer 31.

If controller 11 determines at step S23 that rack 200 yet to be processed is not set on drawer 31 on the opposite side, controller 11 moves at step S24 holder 12a to the initial position. At step S25, controller 11 unlocks drawer 31 which has been locked because the drawer was under processing immediately before, and returns the processing to step S12.

Figure 8:
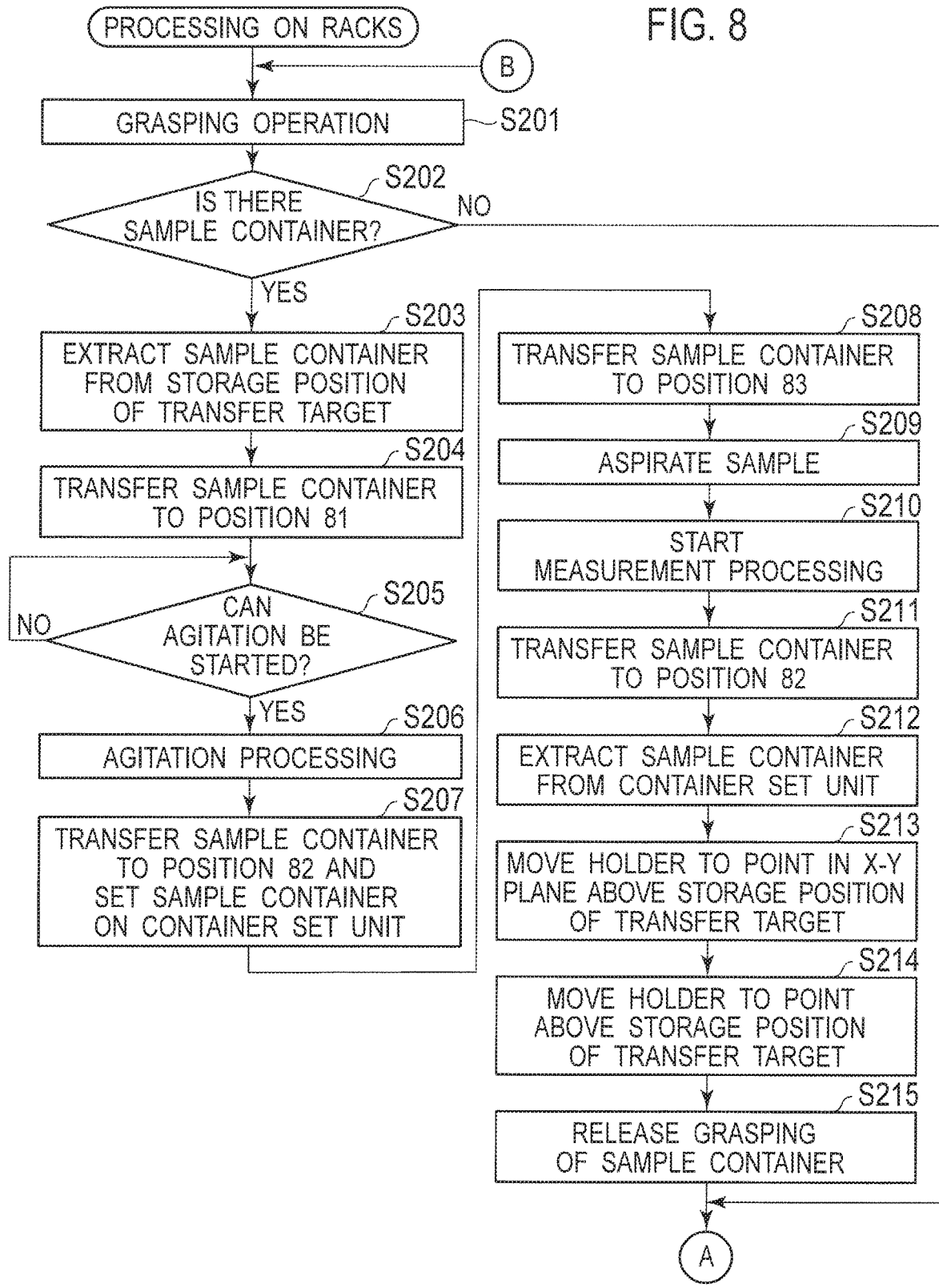
FIG. 8 is a flowchart illustrating processing on the rack according to one or more embodiments.
Figure 9:
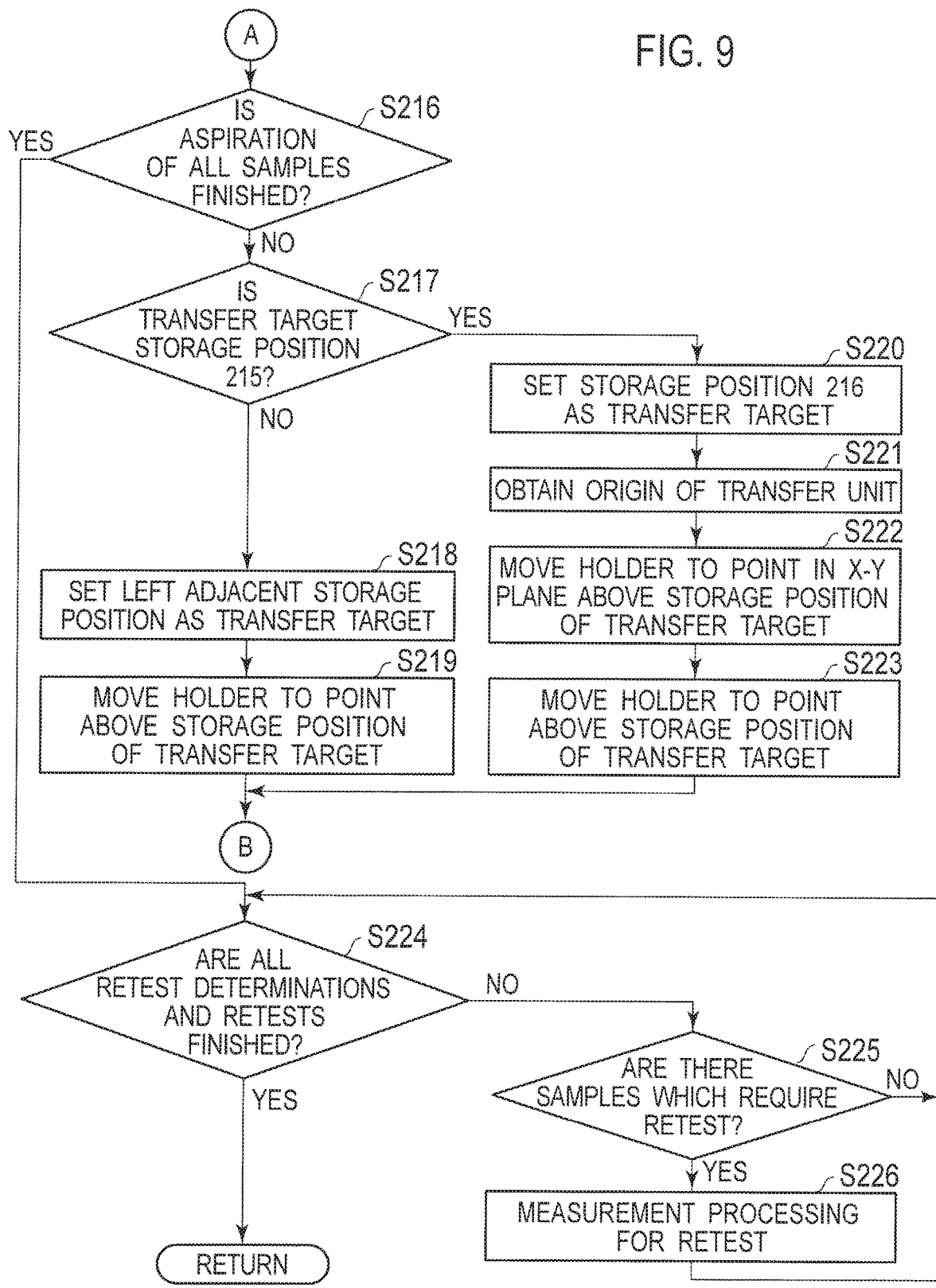
FIG. 9 is a flowchart illustrating processing on the rack according to one or more embodiments.

Next, a description is provided for the processing on the racks at step S22 with reference to flowcharts of FIGS. 8 and 9.

With reference to FIG. 8, controller 11 performs at step S201 a grasping operation to close hands 301 and 302 at the storage position of the transfer target, as described with reference to FIGS. 4A and 4B and FIG. 5A. Thus, sample container 100 is detected. If there is sample container 100, a determination result is YES at step S202. In this case, controller 11 elevates at step S203 holder 12a, and picks up sample container 100 being grasped from the storage position of the transfer target. At step S204, controller 11 causes transfer unit 12 to transfer picked-up sample container 100 to position 81. On the other hand, if there is no sample container 100, the determination result is NO at step S202. In this case, controller 11 skips steps S203 to S215 and advances the processing to step S216 in FIG. 9.

At step S205, controller 11 determines whether or not the agitation processing can be started on sample container 100 positioned at position 81. For example, there may be a case where preceding sample measurement is completed and a case where the preceding sample measurement is not completed after controller 11 immediately performs the agitation processing on sample container 100 positioned at position 81 and transfers sample container 100 to position 83. A time period from the end of agitation to the start of measurement varies for different samples if samples are immediately aspirated when the preceding sample measurement is completed and, when the preceding sample measurement is not completed, samples are not aspirated until the preceding sample measurement is completed. This may give rise to a problem that measurement results vary for different samples. For this reason, it is desirable that each sample can immediately be aspirated after sample container 100 is agitated and sample container 100 is transferred to position 83.

Thus, at step S205, controller 11 suspends the processing until sample container 100 after agitation is transferred to position 83 and the sample therein can immediately be aspirated. Controller 11 acquires the timing at which the preceding sample measurement is completed, and decides the timing to start the agitation processing based on the timing at which the preceding sample measurement is completed. Thus, time periods from the end of agitation to the start of measurement are made equal, making it possible to reduce the variation in the measurement results.

If the agitation processing is made possible, controller 11 performs at step S206 the agitation processing on sample container 100 positioned at position 81. At step S207, controller 11 causes transfer unit 12 to transfer agitated sample container 100 from position 81 to position 82, and causes holder 12a to descend and then to set sample container 100 on container set unit 32. At step S208, controller 11 causes container set unit 32 to transfer sample container 100 from position 82 to position 83. At step S209, controller 11 causes piercer 33 to aspirate a sample from sample container 100. At step S210, controller 11 starts measurement processing on the aspirated sample.

When the measurement processing is started, sample measurement to be described later is performed. After that, analysis processing to be described later is performed based on the measurement results of the measurement processing. Controller 11 determines whether or not a retest is necessary based on the results of the analysis processing. The measurement processing, the analysis processing, and the determination as to whether or not a retest is necessary are performed in parallel with other processing. A description is provided later for the measurement processing and the analysis processing with reference to FIGS. 10A and 10B.

At step S211, controller 11 causes container set unit 32 to transfer sample container 100, finished with aspiration, from position 83 to position 82. At step S212, controller 11 causes hands 301 and 302 to grasp sample container 100 positioned at position 82, to elevate holder 12a, and to pick up sample container 100 being grasped from container set unit 32.

At step S213, controller 11 causes holder 12a to move in the X-axis direction and the Y-axis direction, and to move to a point in the X-Y plane above the storage position of the transfer target. Subsequently, at step S214, controller 11 causes holder 12a to move down and to move to a point above the storage position of the transfer target. To be more specific, at step S214, holder 12a is positioned above the storage position of the transfer target such that the position in the up-down direction of hands 301 and 302 is one which allows sample container 100 being grasped to be stored at the storage position of the transfer target. Here, the position in the up-down direction of hands 301 and 302 is the same as the position which allows hands 301 and 302 to grasp body part 101 of sample container 100 stored at the storage position. Thus, as illustrated in FIG. 4B, sample container 100 is returned to the original storage position of original rack 200. At step S215, controller 11 causes hands 301 and 302 to open, thereby releasing the grasping of sample container 100.

With reference to FIG. 9, at step S216, controller 11 determines whether or not the aspiration of all samples on rack 200 to be processed has finished. If the aspiration has not finished for all samples, controller 11 determines at step S217 whether or not the transfer target is storage position 215. In other words, at step S217, controller 11 determines whether or not there is a storage position yet to be set as the transfer target on the same row as that of the storage position of the current transfer target.

If the determination is NO at step S217, in other words, if the transfer target is not storage position 215, controller 11 sets at step S218 the left adjacent storage position as the transfer target. At step S219, controller 11 causes holder 12a to move to a point above the storage position of the transfer target. After that, the processing is returned to step S201 of FIG. 8.

Here, a description is provided for a case where it is determined at step S217 that the transfer target is not storage position 215 after it is determined at step S202 that there is no sample container 100 at the storage position of the transfer target.

In this case, at step S219, holder 12a is sent to a point above the left adjacent storage position along the shortest path without being transferred along an unnecessary path, for example, being moved in the up-down direction. To be more specific, as illustrated in FIG. 4A, while the position in the up-down direction of hands 301 and 302 is set at the position which allows hands 301 and 302 to grasp body part 101 of sample container 100 stored at the storage position, holder 12a is sent in the negative X-axis direction. Then, after the processing is returned to step S201, determination is made as to whether or not there is sample container 100 at the storage position of the transfer target. Thus, if there is no sample container 100 at the storage position of the transfer target, holder 12a is sequentially sent to a point above the next storage position without tracing an unnecessary path, and searches for sample container 100 at the storage position of the transfer target. Hence, it is possible to efficiently transfer sample container 100 to processing unit 14, and to improve sample processing efficiency.

In this case, after hands 301 and 302 are opened as a result of the determination that there is no sample container 100 at the storage position of the transfer target, controller 11 causes at step S219 hands 301 and 302 to move to a point above the left adjacent storage position with hands 301 and 302 not elevated but opened. Since hands 301 and 302 are not elevated, this eliminates the necessity of supplying a pressure to cylinder 62b for elevating hands 301 and 302. Thus, it is possible to save air provided by pneumatic pressure source 15.

In this case, at step S219, holder 12a is sent to a point above the left adjacent storage position along the shortest path, but the path is not limited to the above one. Holder 12a may be moved to a point above the left adjacent storage position by being moved upward, leftward, and downward. Also in this case, the transfer path of holder 12a is shorter compared to the case where holder 12a is moved to a point above the left adjacent storage position after holder 12a is transferred to agitation unit 14a or measurement unit 14b of processing unit 14. Thus, it is possible to improve sample processing efficiency. As described above, sample processing efficiency can sufficiently be improved even if holder 12a is directly sent to a point above the left adjacent storage position along, for example, a path traced upward, leftward, and downward as well as the above-mentioned shortest path. The word "directly" may include, as described above, the transfer of holder 12a to a point above the next storage position newly set at step S210 without diverting holder 12a from the same row as that of the storage position of the transfer target.

If the determination is YES at step S217, in other words, if the transfer target is storage position 215, controller 11 sets at step S220 storage position 216 as the transfer target. At step S221, controller 11 obtains the origin of transfer unit 12 as in the case of step S16 of FIG. 6.

At step S222, controller 11 causes holder 12a to move in the X-axis direction and the Y-axis direction, and to move to a point in the X-Y plane above storage position 216 of the transfer target. Subsequently, at step S223, controller 11 causes holder 12a to move down and to move to a point above storage position 216 of the transfer target, as illustrated in FIG. 4A. To be more specific, at step S223, holder 12a is positioned above storage position 216 of the transfer target such that the position in the up-down direction of hands 301 and 302 is in alignment with a position which allows hands 301 and 302 to grasp body part 101 of sample container 100 stored at the storage position. After that, the processing is returned to step S201, and determination is made as to whether or not there is sample container 100 at storage position 216 of the transfer target.

Thus, controller 11 sequentially detects whether or not there is sample container 100 for all storage positions, and if there is sample container 100 at a storage position, controller 11 aspirates a sample from this sample container 100. Then, when aspiration of all samples on rack 200 to be processed finishes, controller 11 makes a determination YES at step S216, and advances the processing to step S224.

At step S224, controller 11 determines whether or not all retest determinations and necessary retests have finished for all samples on rack 200 to be processed. If the determination at step S224 is NO, in other words, if not all retest determinations and necessary retests have finished, controller 11 determines at step S225 whether or not there are samples that may require a retest, based on analysis results of the initial test. If there are samples that may require a retest, controller 11 performs at step S226 measurement processing for retest on the samples that may require a retest in the same procedures as those of the above-described initial test. To be more specific, after the agitation processing is performed, sample container 100 determined to require a retest is transferred to position 83. Then, the sample inside sample container 100 is aspirated and the measurement processing is performed again on the sample. When aspiration for retest finishes, sample container 100 is returned to the original storage position.

If the determination at step S224 is YES, in other words, if all retest determinations and necessary retests have finished, the processing on the rack finishes and the processing is advanced to step S23 of FIG. 6.

Figure 10A:
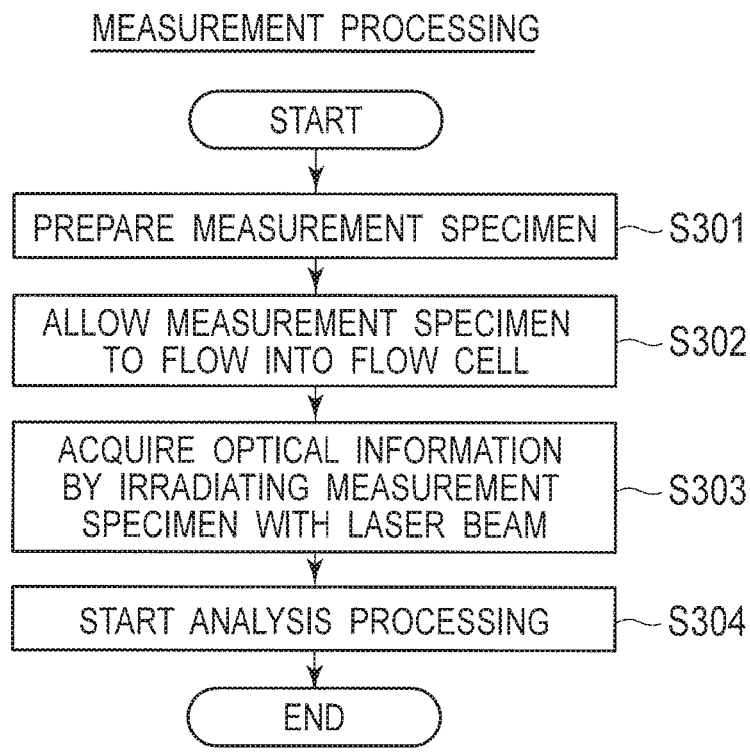
FIGS. 10A and 10B are flowcharts illustrating measurement processing and analysis processing according to one or more embodiments, respectively.

As illustrated in FIG. 10A, when the measurement processing is started, controller 11 causes at step S301 specimen preparation unit 34 to prepare a measurement specimen based on the aspirated sample. At step S302, controller 11 allows the prepared measurement specimen to flow into flow cell 35a. At step S303, controller 11 causes detector 35 to irradiate the measurement specimen flowing through flow cell 35a with a laser beam, thereby acquiring optical information based on forward scattered light, side scattered light, and fluorescent light produced from particles contained in the measurement specimen.

Here, sample measurement apparatus 10 has a DIFF measurement mode for measuring white blood cells, a RET measurement mode for measuring reticulocytes, and a PLT measurement mode for measuring platelets. Controller 11 sequentially performs the processing of steps S301 to S303 for each measurement mode. When the processing of steps S301 to S303 for each measurement mode finishes, controller 11 starts at step S304 the analysis processing.

Figure 10B:
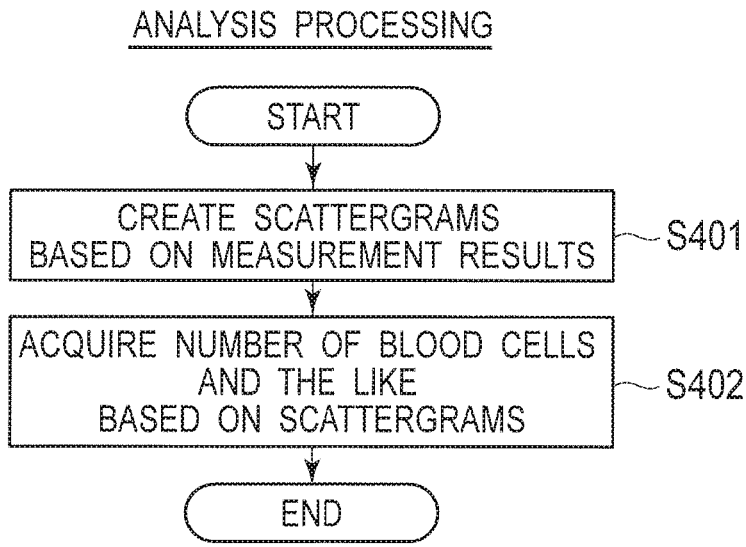
Figure 11A:
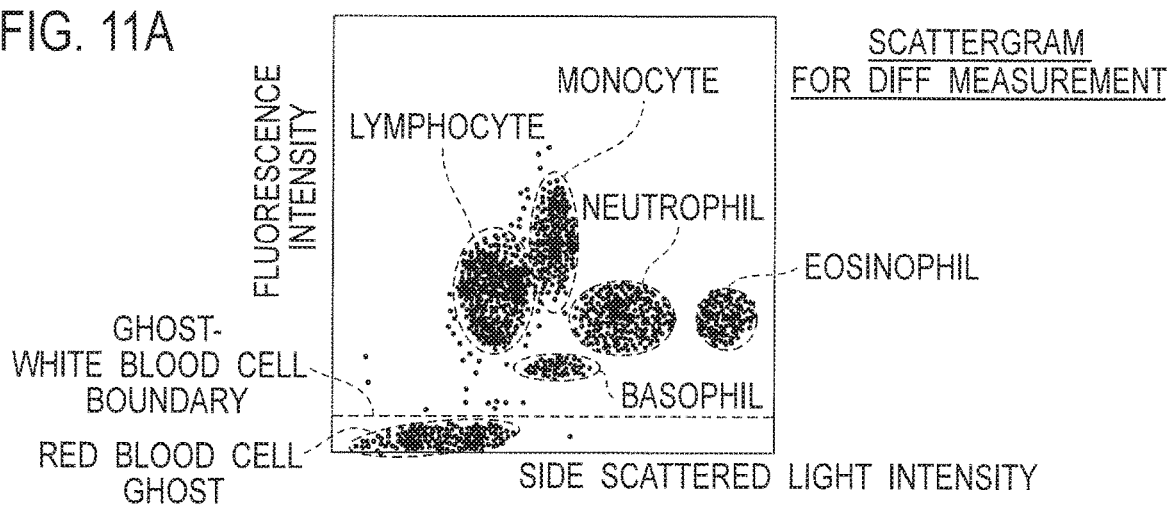
FIGS. 11A to 11C are scattergrams respectively illustrating results of DIFF measurement, RET measurement, and PLT measurement according to one or more embodiments.
Figure 11B:
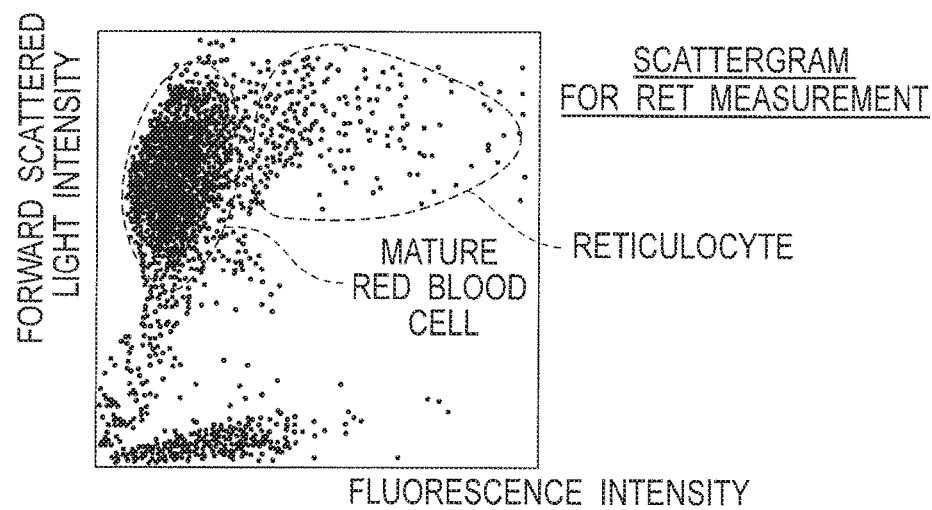
Figure 11C:
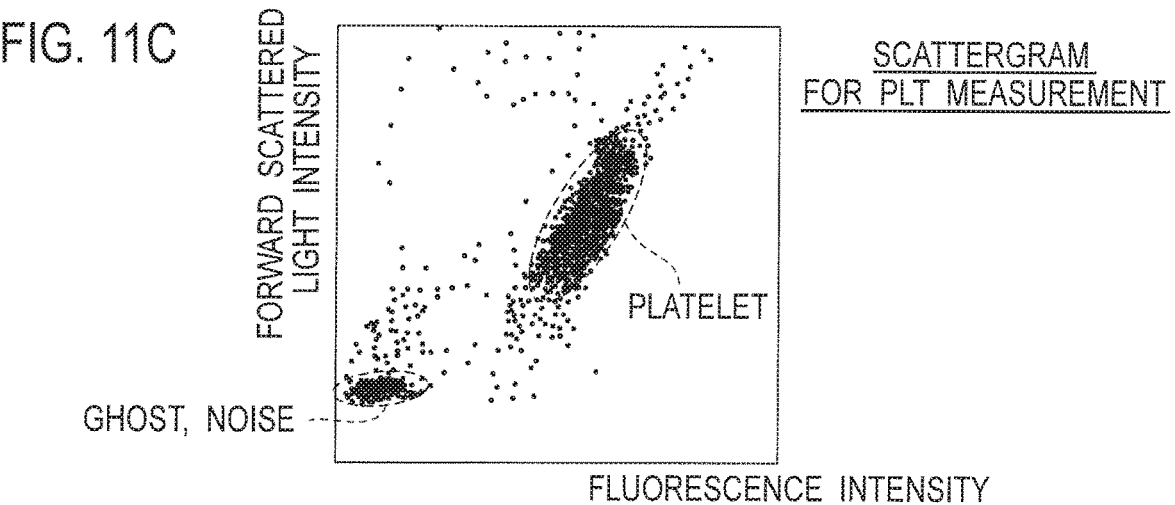

As illustrated in FIG. 10B, when the analysis processing is started, controller 11 creates at step S401 scattergrams illustrated in FIGS. 11A to 11C based on the results obtained in the measurement processing. At step S402, controller 11 acquires analysis results such as the number of blood cells based on the created scattergrams.

Both the measurement processing and the analysis processing are performed by sample measurement apparatus 10, but the embodiment is not limited to the above. The configuration may be such that sample measurement apparatus 10 performs a transfer operation to pick up sample container 100 from rack 200 and to transfer the sample container to position 82, and both the measurement processing and the analysis processing are performed by another apparatus. Alternatively, the configuration may be such that sample measurement apparatus 10 performs the transfer operation and the measurement processing, and the analysis processing is performed by another apparatus.

Note that controller 11, and the like in sample measurement apparatus 10 are implemented such that, for example, a circuitry such as one or more central processing units (CPUs) or processors provided in sample measurement apparatus 10 executes a predetermined program(s).

According to one or more embodiments, it is possible to improve sample processing efficiency.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

The invention claimed is:

1. A sample measurement apparatus capable of processing a sample or samples stored in a sample container or sample containers stored on a rack, the apparatus comprising:
   a controller programmed to perform control;
   a processing unit that aspirates the sample stored in the sample container and measures the sample, under the control of the programmed controller;
   a transfer unit that includes a holder to hold the sample container, and that picks up and transfers, under the control of the programmed controller, the sample container from the rack capable of storing one or more of the sample containers at storage positions on a row to the processing unit;
   a detection unit that is attached to the holder and is movable integrally with the holder; and
   wherein the holder includes: a first claw; a second claw; and an open-close mechanism to open and close the first claw and the second claw under the control of the programmed controller,
   wherein the controller is programmed to control the detection unit to detect a presence or an absence of the sample container at a storage position based on a distance between the first and second claws in a case of the open-close mechanism closing the first and second claws, the distance varying with or without the sample container between the first and second claws,
   wherein
   the controller is programmed to control the transfer unit to transfer one or more of the sample containers stored on the rack one by one,
   the storage positions include a first storage position and a second storage position,
   in a case of the detection unit being located at a point above the first storage position and detecting that the sample container is at the first storage position, the controller is programmed to control the transfer unit to transfer the detected sample container from the first storage position to the processing unit, and
   in a case of the detection unit being located at the point above the first storage position and detecting that the sample container is not at the first storage position, the controller is programmed to control the holder to directly move from the point above the first storage position to a point above the second storage position, and is programmed to control the detection unit to detect whether there is another sample container at the second storage position.

2. The sample measurement apparatus according to claim 1, wherein
   the second storage position is arranged on the same row as the first storage position.

3. The sample measurement apparatus according to claim 1, wherein
   the row of the storage positions includes a plurality of rows, and in a case of the absence of the second storage position on a first row of the plurality of rows, the controller is programmed to set a predetermined storage position on a second row of the plurality of rows as a second storage position on the second row and is programmed to control the holder to move to the point above the second storage position on the second row, and is programmed to control the detection unit to detect whether there is a sample container at the second storage position on the second row.

4. The sample measurement apparatus according to claim 1, wherein
the storage positions include more than two storage positions, and the first storage position is adjacent to the second storage position among the storage positions on the rack, and
in a case of the detection unit detecting that there is no sample container at the first storage position, the controller is programmed to control the holder to move to the point above the second storage position adjacent to the first storage position, and is programmed to control the detection unit to detect whether there is a sample container at the second storage position.

5. The sample measurement apparatus according to claim 1, wherein
the holder includes two hands and each of the first and second claws are respectively attached to one of the two hands;
the controller is programmed to control the hands to move upward and downward, and
in a case of the holder being moved to the first storage position and the detection unit detecting that there is no sample container at the first storage position, the controller is programmed to control the hands to move to the second storage position with the hands not moved upward but opened.

6. The sample measurement apparatus according to claim 5, wherein
the controller is programmed to control the hands to move upward or downward, the hands being outside on the rack, and
the controller is programmed to control the hands to move upward to pick up a sample container from a rack, the hands being inside on the rack.

7. The sample measurement apparatus according to claim 1, further comprising a first drawer to which a first rack is installed and a second drawer to which a second rack is installed, wherein
the controller is programmed to control the transfer unit to transfer one or more sample containers on the second rack installed to the second drawer until transferring all of one or more sample containers on the first rack installed to the first drawer is completed.

8. The sample measurement apparatus according to claim 7, further comprising lock units that lock the first drawer and the second drawer, respectively, wherein
the controller is programmed to control the respective lock unit to unlock the first drawer after controlling the holder to recede from the first rack installed to the first drawer.

9. The sample measurement apparatus according to claim 1, wherein
the processing unit includes a measurement unit that measures a sample stored in a sample container and an agitation unit that performs an agitation operation on a sample container storing a sample, and the controller is programmed to control the transfer unit to transfer a sample container storing a sample from the rack to the measurement unit via the agitation unit.

10. The sample measurement apparatus according to claim 9, wherein
in a case of the measurement unit measuring a sample stored in a different sample container, the controller is programmed to control the agitation unit to start the agitation operation based on a completion timing of a measurement of the sample stored in the different sample container.

11. The sample measurement apparatus according to claim 1, wherein
in a case of the holder being at a predetermined position, the controller is programmed to skip an initialization operation on the transfer unit.

12. The sample measurement apparatus according to claim 3, wherein
the holder includes two hands and each of the first and second claws are respectively attached to one of the two hands;
the controller is programmed to control the hands to move upward and downward, and
in a case of the holder being moved to the first storage position and the detection unit detecting that there is no sample container at the first storage position, the controller is programmed to control the hands to move to the second storage position with the hands not moved upward but opened.

13. The sample measurement apparatus according to claim 4, wherein
the holder includes two hands and each of the first and second claws are respectively attached to one of the two hands;
the controller is programmed to control the hands to move upward and downward, and
in a case of the holder being moved to the first storage position and the detection unit detecting that there is no sample container at the first storage position, the controller is programmed to control the hands to move to the second storage position with the hands not moved upward but opened.

14. The sample measurement apparatus according to claim 3, further comprising a first drawer to which a first rack is installed and a second drawer to which a second rack is installed, wherein
the controller is programmed to control the transfer unit to transfer one or more sample containers on the second rack installed to the second drawer until transferring all of one or more sample containers on the first rack installed to the first drawer is completed.

15. The sample measurement apparatus according to claim 4, further comprising a first drawer to which a first rack is installed and a second drawer to which a second rack is installed, wherein
the controller is programmed to control the transfer unit to transfer on one or more sample containers on the second rack installed to the second drawer until transferring all of one or more sample containers on the first rack installed to the first drawer is completed.

16. The sample measurement apparatus according to claim 1,
wherein the detection unit includes: an operating unit attached to one of the first claw and the second claw and configured to move together with an open-close operation of one of the first claw and the second claw;

and a detector to detect whether the operating unit is brought to a detection position, wherein the operating unit is not detected to be at the detection position in a state in which the first claw and the second claw are closed with a presence of a sample container therebetween, and the operating unit is detected to be at the detection position in a state in which the first and second claws are closed without a sample container therebetween, and thereby the detection unit recognizes a presence of a sample container at one of the storage positions on the rack.

* * * * *